United States Patent
Craddock et al.

(10) Patent No.: US 6,351,771 B1
(45) Date of Patent: *Feb. 26, 2002

(54) DISTRIBUTED SERVICE NETWORK SYSTEM CAPABLE OF TRANSPARENTLY CONVERTING DATA FORMATS AND SELECTIVELY CONNECTING TO AN APPROPRIATE BRIDGE IN ACCORDANCE WITH CLIENTS CHARACTERISTICS IDENTIFIED DURING PRELIMINARY CONNECTIONS

(75) Inventors: Arthur Julian Patterson Craddock, Greely; Ramzan A. Khuwaja; Steve Michael Armstrong, both of Nepean, all of (CA)

(73) Assignee: Nortel Networks Limited, Quebec (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/041,128

(22) Filed: Mar. 12, 1998

(30) Foreign Application Priority Data

Nov. 10, 1997 (CA) .............................................. 2220578

(51) Int. Cl.[7] ........................... G06F 15/16; H04L 12/66
(52) U.S. Cl. ........................ 709/227; 709/250; 370/352
(58) Field of Search .............................. 709/246, 238, 709/223, 217, 227, 228, 250, 230; 395/762; 340/825; 370/352

(56) References Cited

U.S. PATENT DOCUMENTS

| | | | | |
|---|---|---|---|---|
| 5,517,622 A | * | 5/1996 | Ivanoff et al. | 395/200.13 |
| 5,711,672 A | * | 1/1998 | Redford et al. | 434/307 R |
| 5,742,668 A | * | 4/1998 | Pepe et al. | 379/58 |
| 5,778,189 A | * | 7/1998 | Kimura et al. | 709/236 |
| 5,790,548 A | * | 8/1998 | Sistanizadeh et al. | 370/401 |
| 5,794,039 A | * | 8/1998 | Guck | 395/683 |
| 5,812,639 A | * | 9/1998 | Bartholomew et al. | 379/89 |
| 5,848,415 A | * | 12/1998 | Guck | 707/10 |
| 5,864,870 A | * | 1/1999 | Guck | 707/104 |
| 5,870,454 A | * | 2/1999 | Dahlen | 379/88.14 |
| 5,872,779 A | * | 2/1999 | Vaudreuil | 370/352 |
| 5,881,064 A | * | 3/1999 | Lin et al. | 370/395 |
| 5,898,834 A | * | 4/1999 | Sharpe et al. | 709/201 |
| 5,901,286 A | * | 5/1999 | Danknick et al. | 709/203 |
| 5,911,069 A | * | 6/1999 | Beard | 395/683 |
| 5,911,776 A | * | 6/1999 | Guck | 709/217 |
| 5,915,095 A | * | 6/1999 | Miskowiec | 709/223 |
| 5,917,820 A | * | 6/1999 | Rekhter | 370/392 |
| 5,920,856 A | * | 6/1999 | Syeda-Mahmood | 707/3 |
| 5,930,777 A | * | 7/1999 | Barber | 705/40 |
| 5,937,168 A | * | 8/1999 | Anderson | 709/238 |
| 6,020,915 A | * | 2/2000 | Bruno et al. | 348/15 |

OTHER PUBLICATIONS

Miucrosoft Press, Computer Dictionary third edition, Microsoft Corporation, 6 pages, 1997.*

* cited by examiner

Primary Examiner—Le Hien Luu
Assistant Examiner—Bunjob Jaroenchonwanit
(74) Attorney, Agent, or Firm—Killworth, Gottman, Hagan & Schaeff LLP (57) ABSTRACT

A distributed service network provides telecommunications and other services to users transparently of where the user accesses the network and the particular client used to access the network. The network comprises a plurality of regions, each comprising a region manager and one or more region servers. A personal agent is defined for each user and is replicated to remote regions in the network from the user's home region as the user connects through those remote regions. The personal agent stores user information including services to which the user is subscribed and preferences set by the user. The region servers include a set of transducers which operate to make services transparent to the actual client used to connect to the network and to the service provider.

30 Claims, 3 Drawing Sheets

DISTRIBUTED SERVICE NETWORK SYSTEM CAPABLE OF TRANSPARENTLY CONVERTING DATA FORMATS AND SELECTIVELY CONNECTING TO AN APPROPRIATE BRIDGE IN ACCORDANCE WITH CLIENTS CHARACTERISTICS IDENTIFIED DURING PRELIMINARY CONNECTIONS

FIELD OF THE INVENTION

The present invention relates to a distributed service network. More specifically, the present invention relates to a network which provides communications and other services to fixed, mobile and nomadic users in a manner which is transparent to external service providers and users.

BACKGROUND OF THE INVENTION

Recent developments in telecommunications have resulted in networks for a wide variety of services. From conventional voice or data networks to wireless packet and enhanced paging networks, the variety of telecommunications options available to individuals and business is staggering. This variety of options has lead to a revolution in how people live and work and mobile and/or nomadic workers are becoming increasingly common.

While the available telecommunications services have been adopted to various degrees, to a large extent these services, and the networks that support them, remain separate from each other reducing the overall potential of these services. For example, it may not be possible to send email from a personal computer client in an office to a pager client used by a salesman, even though both are connected to respective telecommunications networks.

This lack of integration and/or communication between networks and clients is a recognized problem and a variety of "middleware" products have been proposed and/or produced to transfer data between one network/system and another network/system. For example, Chapter 5 of the publication, "Understanding the Next Phase of Mobile Commuting", 1997, by the Yankee Group is entitled, "Evolving Middleware Solutions for Wireless Remote Access" and discusses middleware solutions for communications with mobile users via wireless communications.

While middleware can be configured to provide the desired interconnectivity for many specific situations, to date no general solution exists to interconnect various telecommunications networks. Further, no solution exists to provide a distributed network to supply a variety of desired services at multiple sites in an essentially transparent and convenient manner for users and service providers. Thus, the long sought goal of communication from any client or service to any other client between any two locations is still largely an unachieved goal.

SUMMARY OF THE INVENTION

It is an object of the present invention to provide a novel network, network region and method for providing telecommunication services which obviates or mitigates at least one disadvantage of the prior art.

According to a first aspect of the present invention, there is provided a distributed service network comprising at least two regions connected by a communications backbone, each said region comprising:

at least one region server including at least one transducer operable to convert an input data stream in a first format to an output data stream in a second data format and a communications host operable to communicate with other region servers in said distributed telecommunications network via a communications backbone;

at least one bridge connected to said at least one region server and operable to establish connections with communications clients;

at least one adapter connected to said at least one region server, said adapter operable to connect to an external service and to permit communications between said external service and said at least one region server; and a region manager connected to each of said at least one region servers and operable to determine the type of a communications client connected to said region and to select a region server and a bridge connected thereto to maintain a connection with said communications client, and wherein data received from either of said external service and said communications client which is in a first data format incompatible with the other of said external service and said communications client is converted to a second data format appropriate to aid other of said external service and said communications client by said transducer.

According to another aspect of the present invention, there is provided a distributed service network comprising at least two regions connected by a communications backbone, each said region comprising:

at least one region server including at least one transducer operable to convert an input data stream in a first format to an output data stream in a second data format and a communications host operable to communicate with other region servers in said distributed telecommunications network via a communications backbone;

at least one bridge connected to said at least one region server and operable to establish connections with communications clients;

at least one adapter connected to said at least one region server, said adapter operable to connect to an external service and to permit communications between said external service and said at least one region server; and a region manager connected to each of said at least one region servers and operable to determine the type of a communications client connected to said region and to select a region server and a bridge connected thereto to maintain a connection with said communications client, and wherein data received from either of said external service and said communications client which is in a first data format incompatible with the other of said external service and said communications client is converted to a second data format appropriate to aid other of said external service and said communications client by said transducer.

The present invention provides a novel distributed service network which allows users to access telecommunications and other external services from any access point in the network. These services are provided transparently to the user and are also provided transparently to the service provider. The network can be customized for each type of client, using parameters known for that client, and can be customized for each user's preferences. Communications through the network are independent of the transport protocol employed, as all protocol, data, API, etc. conversions are automatically performed by a data conversion system and/or adapters in the network. Also, the network and its services are transparent as to where the user connects to the network.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
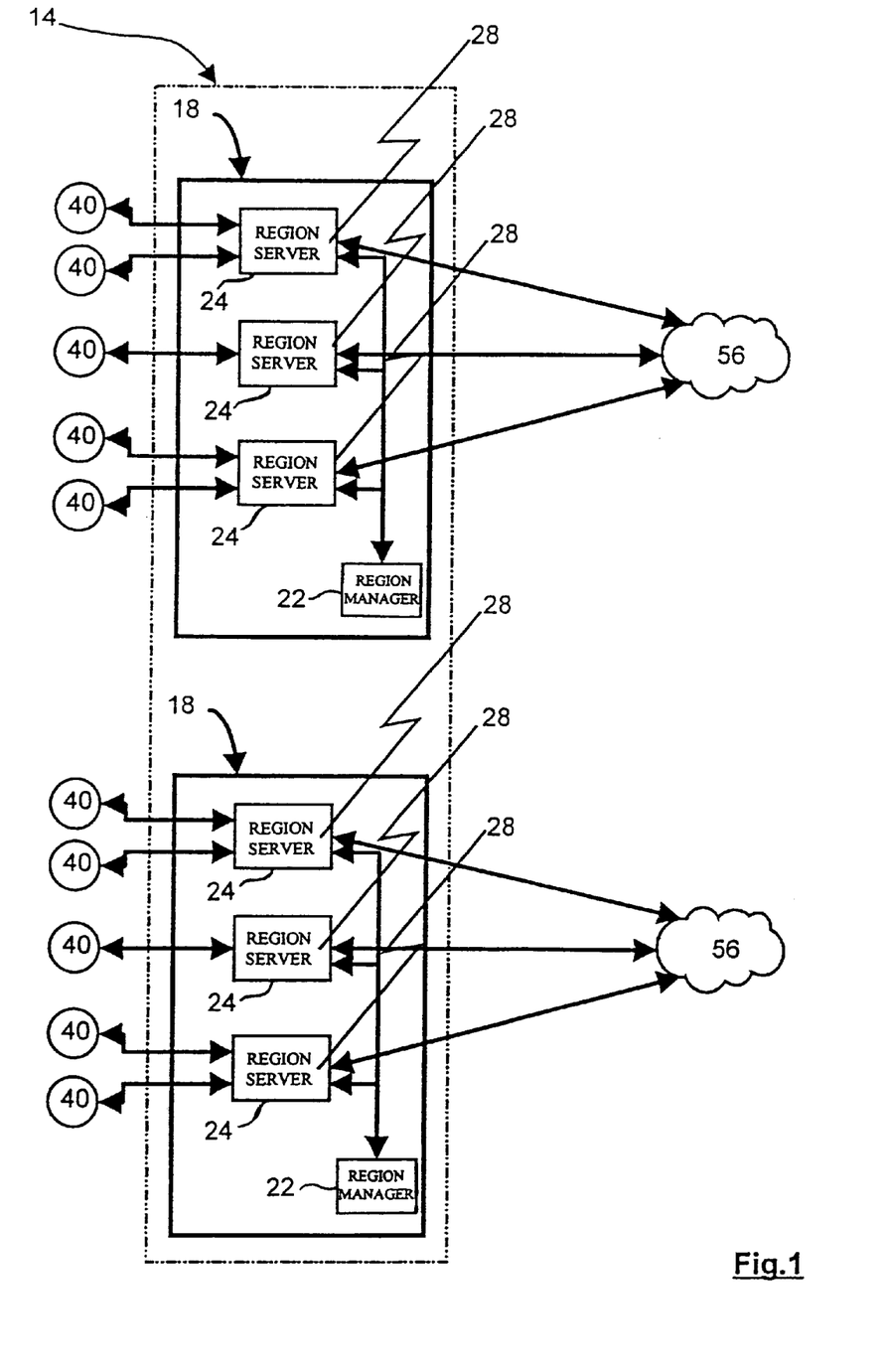
FIG. 1 shows a schematic representation of a distributed service network in accordance with the present invention.

A distributed service network in accordance with an embodiment of the present invention is indicated generally at 14 in FIG. 1. The types of data carried by network 14 is not particularly limited and can include analog and/or digital voice, computer network communications, email, messages for paging systems, etc. and, as will be apparent from the discussion below, network 14 can simultaneously carry multiple types of data, as desired.

Figure 2:
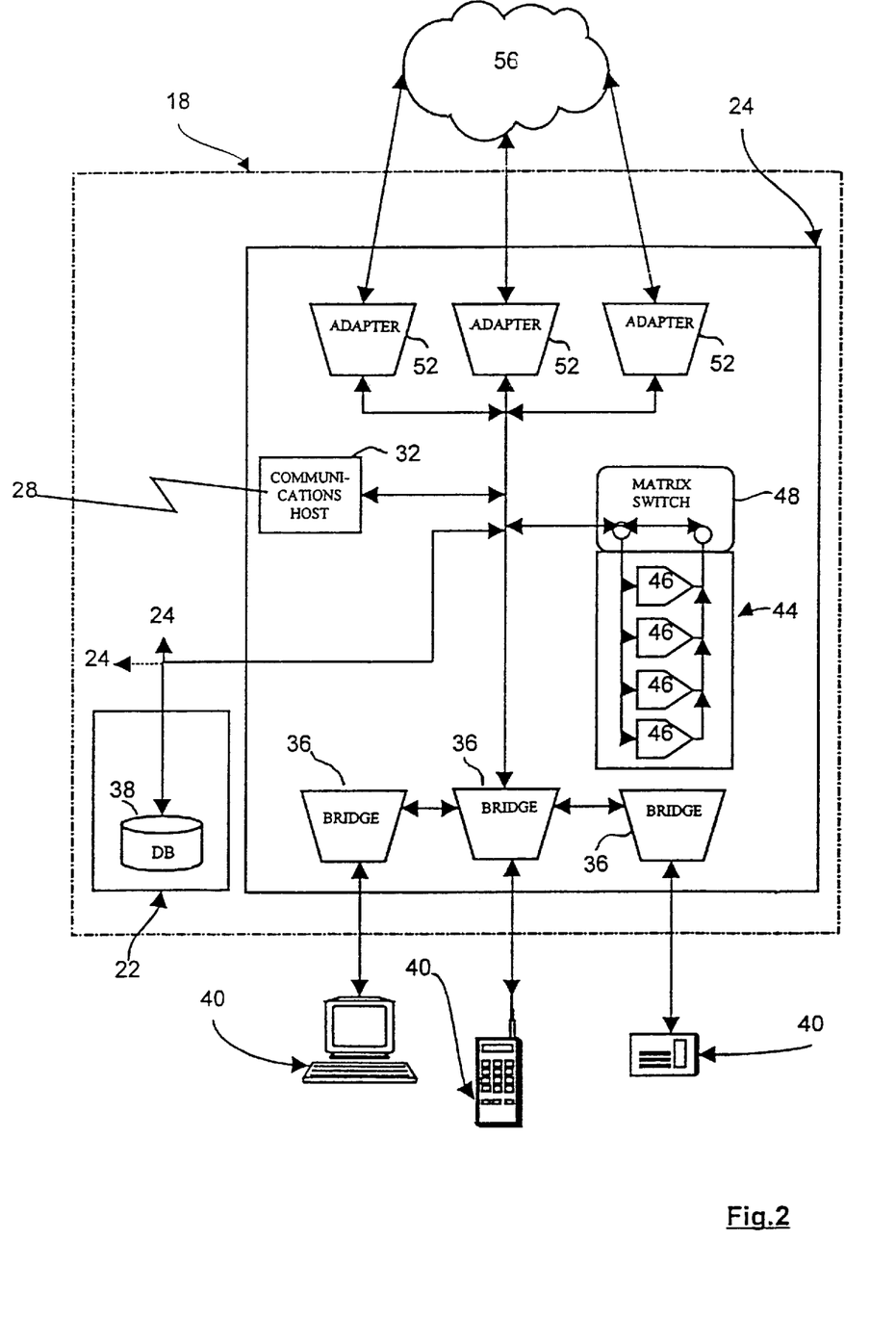
FIG. 2 shows a schematic representation of a region in the distributed service network of FIG. 1.

As shown in FIGS. 1 and 2, network 14 comprises one or more regions 18, each of which comprises a region manager 22 and one or more region servers 24. Each region manager 22 is connected to each region server 24 in its region 18 and each region server 24 is connected to other region servers 24, both those in its region 13 and those in other regions 18, by a communications backbone 28, which can be any suitable communications link, such as T3 lines, high bandwidth fibre optic links, satellite links, etc. or any combination of suitable links.

As shown in FIG. 2, each region server 24 includes a suitable communications host 32 for communications backbone 28 and a plurality of bridges 36 to which clients 40 of network 14 can be connected by dedicated telecommunications lines, dial-up access, wireless services, a public packet network such as the internet, or any other suitable means. For clarity, FIG. 1 shows three region servers 24 in each region 18, but it is contemplated that the number of region servers 24 will vary according to contemplated load for the region and/or the services provided at the region. It is contemplated that at least one region 18 will be created for each geographic area where it is desired to provide a local "point of presence" where a client 40 can connect to network 14. However, network 14 is very flexible and it is also contemplated that two or more regions 18 can be located in a single geographic area with a relatively high number of clients 40, etc., if desired, and in such a circumstance, regions 18 and their respective region servers 24 can be interconnected via backbone 28 or any other suitable means and region managers 22 can perform load and/or service balancing between regions 18.

As is also shown in FIG. 2, region servers 24 include a data stream conversion system comprising set 44 of transducers 46 and a transducer matrix switch 48 to convert data streams between various formats, protocols and standards as required. Region servers 24 also include a set 52 of adapters and service agents, which can communicate with other external services and/or networks 56, such as the internet, to communicate with servers running POP3, SMTP, etc., to perform email tasks, faxing, web browsing, etc. As used herein, the terms "format" or "data format" are intended to comprise any representation of data. For example, digitized speech can comprise one format of data, a color image in a GIF file format another, a black and white image in a black & white GIF file format another, a Group IV facsimile transmission another, a html document another, etc. Further, as used herein the term "data stream" is intended to comprise any collection, logical arrangement or grouping of data, including one or more data files, data packets, streams of data such as digital voice, multimedia, or interactive processes, etc.

Each adapter in set 52 provides a layer of transparency between the protocols and/or API's used by the external service or services to which it connects. Specifically, the adapter operates to convert between service specific protocols or APIs and a generic protocol understood by the region server 24. For example, region server 24 communicates with an adapter 52 for email via a generic "get" and "store" protocol and that adapter 52 can convert between this generic protocol and an IMAP4 email protocol. Thus, the region server 24 and services local to that region server need only employ the simple "get" and "store" protocol and not the complexity of the IMAP4 protocol. This also allows new services and/or amended services to be added to region servers 24, as desired, by merely adding additional protocol conversion adapters.

Clients 40 can comprise a wide variety of telecommunications and/or computing devices including, without limitation, personal computers, cellular or PCS handsets, pagers, wireless-capable personal digital assistants (PDAs) and any other device or system which requires voice or data telecommunications services.

Region manager 22 includes a database engine 38, which maintains a variety of information regarding the users of network 14 and which maintains a registry of information relating to clients 40 which can connect to network 14. This client registry includes information on how to establish and maintain a connection to each client 40, as well as the capabilities and limitations of each client 40. Region manager 22 monitors each region server 24 to perform load balancing between region servers 24, and to manage the establishment of connections, as described below in more detail.

When a client 40 wishes to connect to network 14, either by a dial up line, wireless connection or other data link, a connection, referred to herein as a preliminary connection, is established between the client and one of bridges 36. The region server 24 which is connected to the bridge 36 to which the preliminary connection has been made notifies the region manager 22 which determines the type of client 40. In some circumstances, such as wherein the preliminary connection is established with a GSM cellular telephone employing the SMS protocol, the bridge 36 with which the preliminary connection is established will implicitly identify to the region manager 22 the type of client 40. In other cases, such as the case of a dial up line, region manager 22 and the bridge 36 with which the preliminary connection is established must determine the type of client 40 employed with the connection, such as a digital voice telephone, analog voice telephone, WEB browser, etc. This determination can be effected by analyzing initialization procedures, by querying the client 40, or by any other suitable method as will occur to those of skill in the art.

Once the type of client 40 is identified, region manager 22 checks the client registry in database engine 38 for the characteristics of client 40 and ensures that the preliminary connection is transferred to an appropriate bridge 36, either at the region server 24 to which the preliminary connection was originally made, or to another region server 24, as appropriate. The selection of which region server 24 is to handle the connection can be based upon a number of criteria, including the present workload of each of the region servers 24, the type of client 40, etc. For example, one or more region servers may be configured with specific hardware or otherwise optimized to handle connections to http browser clients 40 and another for voice mail.

If a user changes the type of client 40 being employed while connected to a region server 24, for example changing from a POP3 email client to a web browser client, or if a region server 24 has an excessive load, region manager 22 can transfer control of the connection, if appropriate, to a different region server 24 in region 18 transparently to the user.

Next the identity of the user of client 40 is verified. This verification can comprise: an explicit step, such as the user inputting a user ID and password; or an implicit step, such as the connection being to a known address, such as an IP address or DN (directory number); etc. and can be performed by the region manager 22, or one or more region servers 24 within region 18 which have capacity allocated for this task. In FIGS. 1 and 2, the former alternative is illustrated and verification information is compared to information in database engine 38 to verify the identity of the user. Once the identity of the user has been verified, the preliminary connection becomes a complete connection and data access requests from the user are serviced.

In one embodiment of the present invention, once the identity of a user is verified and a complete connection is established, a personal agent for the user is accessed from database engine 38, onto a server 24. The personal agent maintains a record, referred to herein as a user profile, of the services to which the user subscribes, user preferences for various possible client devices employed by that user and any other preferences of the user as well as billing information for the user. In addition to the user profile and preferences, the personal agent also provides access to all relevant services data for user data access requests, including Email services for the user, passwords and user identifications for other services, etc.

While the use of a personal agent is presently preferred, network 14 is not limited to the use of a personal agent, and user profiles and related information can be stored in network 14 in any suitable manner as will occur to those of skill in the art.

If the user has connected to a region 18 which is not the "home" region 18 (i.e.—the region 18 at which the user's data normally resides) of the user, the verification is performed by either: consulting a registry of users maintained in database engine 38 to identify the home region 18 of the user; by sending a query to a centralized user registry server (not shown) which is connected to network 14 via communications backbone 28, or by sending a query from the connected (local) region manager 22 to the region managers 22 of neighboring regions 18 via backbone 28 to locate the database engine 38 with required information to verify the user. In this last case, if none of the neighboring regions 18 are the home region 18 of the user and thus do not have the necessary information for the user on their database engine 38, the query is relayed to additional regions 18 until either the home region 18 is identified. If at any point it is determined that the user is not an authorized user for network 14, the preliminary connection between client 40 and bridge 36 is terminated. There are a variety of suitable techniques that will be apparent to those of skill in the art for determining when a user verification query has been successful, or unsuccessful, and this will not be further discussed herein.

Once the home region 18 has been identified for the user and the user's identity has been confirmed and a complete connection established, the personal agent at the home region 18 can be accessed, via communication backbone 28, by the remote region 18 or the personal agent can be replicated to the local region 18 from the home region 18, via back bone 28. The determination of whether to access the personal agent via backbone 18 or whether to replicate the personal agent at the remote region 18 is based upon a suitable preselected quality of service (QoS) metric and can include a consideration of: the communications latency between the remote region 18 and the home region 18 over communications backbone 28; the length of the time the user is expected to require access to the data at the local region 18; the amount of data the user requires access to; and other relevant factors as will occur to those of skill in the art.

If the personal agent for a user is replicated to remote region 18, the entire personal agent is not necessarily replicated and, preferably, only information which is immediately required, or which is likely to be required imminently, is replicated to reduce the transfer and/or storage of unnecessary data. To further reduce the storage of unnecessary data, the replication of the personal agent in a local region 18 is stored in a persistent cache, as will be described in more detail below.

Once a full connection is established with a region server 24, the user has complete access to all services through network 14 which the user is authorized to access, as determined from the user's personal agent or other user profile information, essentially independent of the client 40 he has employed to connect to the network and all authorized data access requests are served by network 14 to client 40. This client independence is accomplished via the client registry and set 44 of transducers 46 and transducer matrix switch 48.

Specifically, as mentioned above, region manager 22 and bridge 36 determine what type of client 40 is communicating with bridge 36. This information is used to identify the entry for that client in the client registry and the characteristics of that client, including its requirements, capabilities and limitations are provided to transducer matrix switch 48, as are the characteristics of the type of service being accessed which is determined from the adapter 52 making the connection to the service. The user profile is also accessed to determine any user specified preferences for that type of client.

Transducer matrix switch 48 arranges, configures and/or connects one or more transducers 46 in set 44, as necessary, to convert between the data formats (types and/or protocols) employed by client 40 and the data formats employed by the service being accessed. If no single transducer 46 exists in set 44 which can effect the necessary conversion, then transducer matrix switch 48 will chain two or more transducers 46 together, with the output of one transducer being the input to the next, to accomplish the necessary conversion. In one embodiment, transducer matrix switch 48 receives an input from bridge 36 as to the format employed by client 40 and receives an input from set of adapters 52 as to the data format employed by the external service and these two inputs are used as indices to a look up table, or ordered set, in matrix switch 48 of all possible conversions. The indicated entry in this table defines the required transducer 46, or combination of transducers 46, to effect the desired conversion. As new transducers 46 are added to set 44, the conversion look up table is updated accordingly.

Further, in some circumstances two or more transducers 46, or chains of transducers 46, can be employed in parallel. For example, a Group IV facsimile message can be received by one of set 52 of adapters for access by a PCS telephone client 40. In such a case, a first transducer 46 can be employed to perform an optical character recognition (OCR) conversion from the facsimile format to ASCII text format and then a pair of transducers 46 can simultaneously examine the resulting text, one to locate to locate the facsimile sender's name and/or telephone number, and the other to locate the subject matter of the facsimile from a "subject" line. The located "from" and "subject" information is then sent to the user's PCS telephone, in accordance with the client registry information for PCS clients and the users preferences for that client, from the user's profile.

As will be apparent to those of skill in the art, in order to efficiently utilize transducers 46, they can be implemented within a multi-threaded architecture. In this case, every transducer 46 is always available as the architecture will essentially maintain a pool of threads for use.

As an example of the use of a data conversion system in accordance with the present invention, if a user has connected to network 14 via an analog voice telephone client 40 and wishes to access email services, a touch tone response transducer 46 and a text to speech transducer 46 are selected and configured by transducer matrix switch 48 and portions of the email messages will be read to the user. Depending upon the preferences and/or set-up defined by the user for the client 40, as stored in the user's personal agent or other user profile, the user can be provided with the email in a variety of manners. For example, the user can be provided with a prompt, via the text to speech transducer 46, informing the user of the number of new Email messages which have been received and/or the messages or their subject lines can be read to the user via the text to speech transducer 46. A touch tone response transducer 46 can allow the user to select messages of interest to be read or messages to be deleted, etc. by pressing keys on a touch tone phone. A speech recognition transducer 46 can also be employed, either in instead of or in addition to, the touch tone response transducer 46. In such a case, the user can dictate responses to Email, etc. Alternatively, the user can have set their preferences in their personal agent or user profile such that they are only informed of the number of new email messages, and their time of receipt.

As will be apparent, the user's personal agent or user profile can include different preferences for each service when delivered on each different client 40. For example, when the user connects to network 14 via a dial up line with a personal computer running an email program as client 40, the user's email will be fully available to them from the email program in a conventional manner, rather than being read to them via text to speech transducer 46. If that personal computer has connected to network 14 via a cellular modem, with a limited and/or costly bandwidth, the email can be presented as subject lines only, except for messages flagged as urgent. Many other possible configurations and/or options will occur to those of skill in the art.

As mentioned above, transducers 46 can be chained, as necessary, by transducer matrix switch 48 to provide required conversions. For example, if a user wishes to access a web page from an analog voice telephone, transducer matrix switch 48 can employ an HTML to ASCII transducer to receive the HTML definition of the web page and to convert it to ASCII text which would then be passed to a text to speech transducer 46 to convert that ASCII text to speech that the user can receive on their telephone. Similarly, speech recognition or touch tone response transducers can be employed to receive input from the user as to hot links to be followed or other inputs desired.

Set 44 of transducers 46 and transducer matrix switch 48 provide transparent conversion of services within network 14. It is contemplated that, at least to some extent, all services will be transparent or accessible, in accordance with user defined preferences stored in the users' personal agents and that such transparency will not require any steps on the part of the service provider. For example, a user can define that only a count of new Email messages received be sent to their pager, or that a count of all new messages received and the subject lines of messages marked urgent be downloaded, etc. and yet the sender of the email message need not concern themselves with such details.

It is contemplated that, in some circumstances, different region servers 24 in a region 18 can have different transducers 46 in their set 44. For example, a region server 24 can have one or more transducers 46 for text to speech conversions which require special purpose hardware in region server 24. In such a case, only one region server 24 in a region 18 may be equipped with such special purpose hardware and a connection to a client 40 which requires a text to speech transducer 46 can be transferred, as necessary, by matrix transducer switch 48 in the region server 24 handling the connection to a region server 24 in another region 18 which has the necessary transducer 46. The determination of which other region server 24 has the necessary transducer 46 can be determined, for example, by consulting a table of this information which is maintained in each region manager 22 or by any other suitable means, as will be apparent to those of skill in the art.

In addition to performing service to client conversions, network 14 can also perform transport protocol conversions as well. An adapter in set 52 can receive data in one transport protocol and can forward it to another adapter in set 52 wherein it is re-transmitted via another transport protocol. For example, data can be received via TCP/IP by a first adapter in set 52 and transmitted from a second adapter in ATM or Frame Relay protocol. It is contemplated that set 52 can also include encryption and/or decryption engines as well. It is also contemplated that, in some circumstances, transducers 46 can be employed to perform protocol conversions and/or encryption and decryption if desired. It is also contemplated that set of adapters 52 and/or set 44 of transducers can provide API's for legacy logging and billing subsystems to facilitate record keeping for Internet service providers (ISP's), telephone companies, cellular telephone companies, etc.

As mentioned above, there is preferably a personal agent defined for each user which accomplishes several tasks. For example, the personal agent provides access to the information necessary to identify the user to network 14, by a user ID and password, a known IP address, a pager number, a cellular EIN, etc. Additionally, the personal agent can provide access to information such as account and/or password information for third party services to which the user subscribes. For example, for the user can subscribe to a stock quotation and information service which requires the user to identify themselves to the service before being allowed to access the desired the information. While such uses of the personal agent provide convenience to the user, in not having to remember account numbers, passwords, etc., the personal agent can in fact do much more.

Specifically, the user can instruct their personal agent to perform a variety of tasks, ranging from the simple to the quite sophisticated. For example, the user can have defined that their personal agent contact the above-mentioned stock quotation service once every hour to determine the current price of one or more stocks and, if the prices reach a certain price, to contact the user in a defined manner, such as by sending them an email, or paging them, providing them with a synthesized voice message in a voice mailbox or by contacting them on their analog cellular telephone. As will be apparent, set 44 of transducers 46 and transducer matrix switch 48 will be employed, as necessary, in contacting the user via an appropriate client 40, such as by employing a text to speech transducer 46 to provide them with a voice notification on their cellular telephone. It will be apparent to those of skill in the art that a personal agent is not service specific and a personal agent for a user is available for any service available to the user. Thus, it is contemplated that each user can have a single personal agent for all tasks. It is also contemplated that a computer-based graphical user interface will be available to users to allow them to select and define tasks for their personal agents which tasks are then transferred to the personal agent via network 14. The construction and operation of such a PC-based interface, or other suitable means for defining tasks and options for a personal agent, will be apparent to those of skill in the art.

Figure 3:
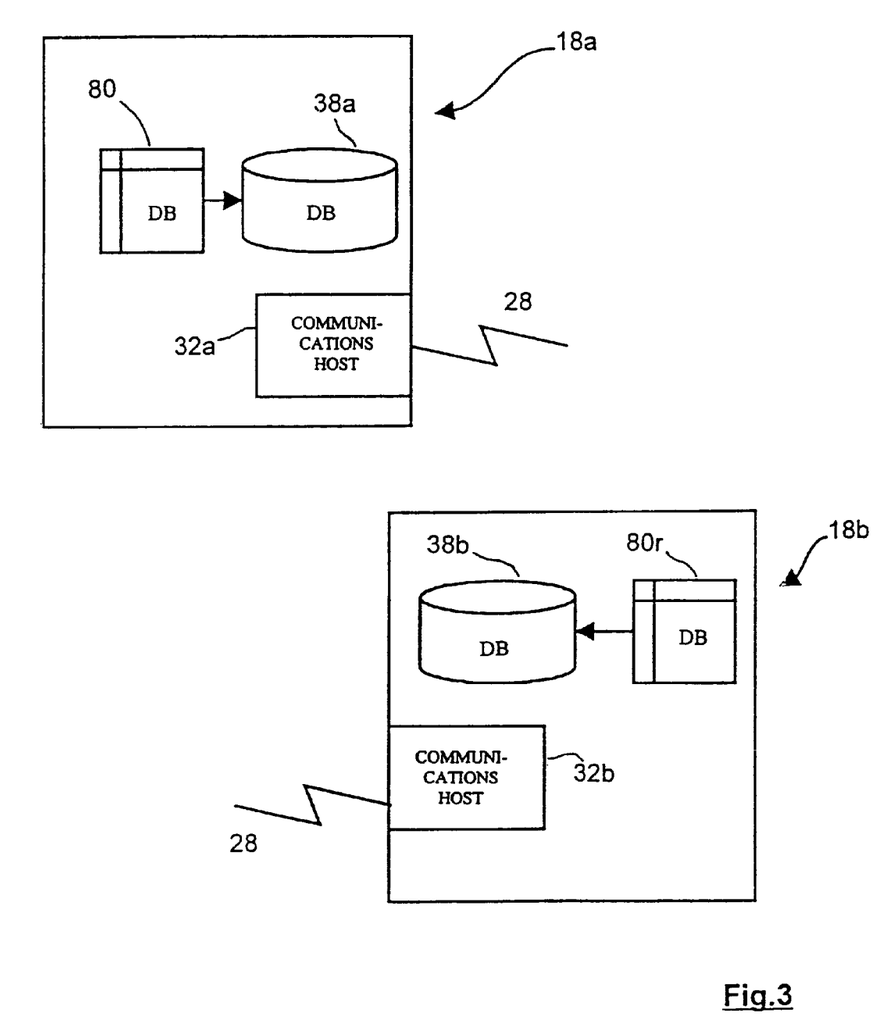
FIG. 3 shows a schematic representation of the replication of a personal agent from a home region in a distributed service network to a persistent cache in a remote region in that network.

As also mentioned above, the present invention includes a persistent caching system for personal agents. As shown in FIG. 3, the home region 18a for a user includes a master personal agent 80 stored in database engine 38a. When a user connects to network 14 through a remote region 18b, and if a predefined QoS metric is not met by accessing the master personal agent 80 via communications backbone 28, master personal agent 80 is replicated, as replicated personal agent 80r, via communications backbone 28 and communications hosts 32a and 32b, to remote region 18b where it is placed in the persistent cache of database engine 38b. As mentioned above, in the initial replication only a minimum portion of the personal agent is replicated. For example, only the information required to identify the user, the services to which the user is subscribed and the user's billing information is transferred.

Once a complete connection is established, depending upon the user's activities, additional information can be transferred to replicated personal agent 80r and/or updates from replicated agent 80r are transmitted to master personal agent 80. For consistency, master personal agent 80 is always updated by a replicated personal agent 80r to reflect all changes and some changes which occur at master personal agent 80 are automatically updated to replicated personal agent 80r. This minimal replication reduces bandwidth and messaging requirements by keeping as much activity as possible within the local region 18b, reducing communications through communications backbone 28.

For example, a user can connect to remote region 18b and the region manager in region 18b locates the master personal agent 80 for the user in region 18a, the user's home region. A replicated personal agent 80r for the user is transferred to region 18b from region 18a and is employed to verify the identity of the user. At this point, depending upon the activities of the user, a variety of transfers can occur between the persistent cache in database engine 38b of region 18b and master personal agent 80. If the user merely places a voice mail message in another user's voice mail box, a billing entry can be added to replicated personal agent 80r and an update transferred to master personal agent 80 to reflect this billing entry.

In a more interesting example, the user can conduct an email session, reading, replying, deleting and creating various messages as desired. In such a case, the user's inbox and address list will be replicated at personal agent 80r and appropriate updates transmitted to master personal agent 80 to flag messages as having been read and/or to remove messages which have been deleted and to update the address list to reflect any changes made by the user. When the user creates new email messages, those messages are sent in a conventional manner and placed in the user's outbox in the persistent cache and updates are sent to master personal agent 80 to be placed in the users' outbox therein. Any email messages received at master personal agent 80 can be automatically replicated to replicated personal agent 80r, if desired. As will be apparent to those of skill in the art, this replication technique can also be employed for GSM voice services to accommodate the Home Location Registry and the Visitor Location Registry employed therein.

Further, in some circumstances data will be transferred from a personal agent (either master personal agent 80 or replicated personal agent 80r) to a client 40 and subsequently changed in that client 40. When that client 40 next connects to network 14, master personal agent 80 can be updated to reflect those changes, either directly or via an update from replicated personal agent 80r. For example, a list of telephone numbers can be downloaded into a client 40 such as a personal digital assistant (PDA) or cellular telephone and the user can subsequently add, delete or amend entries in that list. When that client 40 is again connected to network 14, the copy of that list in master personal agent 80 is updated from client 40 to reflect the additions, deletion and amendments made by the user.

As will be apparent to those of skill in the art, the operation of the persistent cache is transparent to the user and is employed to enhance performance of network 14 by reducing latency time, and in conjunction with the replication strategies, to reduce bandwidth consumption too, where possible. The persistent cache can employ any suitable caching strategy, as will occur to those of skill in the art, but it is contemplated that a FIFO (first in first out) strategy will be employed wherein replicated personal agents 80r in the persistent cache are ranked according to their age in the cache and, when a portion of the cache must be flushed, the oldest entries are removed. This strategy can be enhanced by also tracking for each entry in the persistent cache whether its corresponding master personal agent 80 has been accessed at the home region 18a, or replicated to another remote region, after the last access time of the replicated personal agent 80r in the persistent cache. Replicated personal agents 80r at a region 18b whose corresponding master personal agents 80 have been accessed or replicated since the last access to the replicated personal agent 80r, are flushed from the cache in region 18b.

As will be apparent to those of skill in the art, once a complete connection is established between a client 40 and a region 18, security is maintained by network 14. All connections through communications backbone 28 are secure and/or encrypted to ensure that the identity of the user is authenticated and that the data communications within network 14 are private. Further, communications via set 52 of adapters and service agents with other services can be encrypted and decrypted, as required.

Regions 18 have been constructed of components which are implemented in software, where appropriate, or which have software interfaces which allow for easy upgrading, enhancement and to provide "hot-plugability", i.e.—the ability to add or remove services and/or hardware while network 14 is in operation. Specifically, bridges 36 comprise the necessary hardware to establish connections to client 40 and comprise a software-implemented control which manages the communication with region servers 24. Similarly, database engine 38 includes a suitable database engine and a software-implemented control which manages the persistent cache and other functions of the database engine 38. Set 44 of transducers 46, and transducer matrix switch 48 also comprise software-implemented components which either control hardware and/or firmware to perform their necessary functions, or which perform these functions themselves. Similarly, set 52 of adapters and service agents include the necessary hardware to perform appropriate communications tasks and a software-implemented control which manages and controls these tasks.

In a preferred aspect of the present invention, these software-implemented controls are constructed as Java servlets, Java Beans and Java Enterprise Beans, as documented in Sun's JavaSoft Java Servlet documentation and in the Java V1.1 documentation and inter-servlet communications is accomplished by way of Java's RMI services, also documented therein.

In an embodiment of the present invention, a wrapper has been added the conventional Java servlets to provide rapid synchronous and asynchronous communications. Specifically, the wrapper extends the functionality of the servlets from their conventional http-based "post" and "get" API to a fully functional asynchronous messaging API by which messages can be sent to any servlet and received from any servlet via a sustained connection, or by a connection which is asynchronous. A servlet extended with this wrapper can communicate synchronously with any other servlet (extended or non-extended) and can also communicate asynchronously with any other extended servlet.

Essentially the wrapper comprises methods which the servlet must implement. The first method is "perform()" which is the synchronous event handler. It is called with an event, returns a value when complete and is blocked while an event is being processed. The second method is "performAsynch()" which is the asynchronous event handler. This method returns a "FutureReply" placeholder object as soon as possible. When event processing is complete, the method then sends an asynchronous reply event to the caller servlet. The FutureReply placeholder includes a unique identifier which allows the receiving servlet to match a subsequently received reply event to the original event. With this method, the caller servlet is free to perform other processing while the event is being processed.

To accommodate these two types of event handling, two different types of events are defined. Specifically, "ServletEvent" and "ServletAsynchEvent" are employed, the former being used for synchronous events and the latter for asynchronous events. In this system, events comprise an identifier of type String, an argument, which can be any Object, and a Session. Because more than one servlet can send an event to an extended servlet, a Session, which is an object that includes a unique identification, is provided to assist the extended servlet in processing synchronous events by allowing the servlet to identify the ordering of events.

While Java servlets, Java Beans, Java Enterprise Beans and the Java RMI interface is presently preferred for implementing the software components of network 14, it will be apparent to those of skill in the art that the present invention is not limited to such an implementation and CORBA (Common Object Request Broker) or other suitable implementations can be employed, in part or in whole, if desired.

As will be apparent to those of skill in the art, several advantages are realized with the use of software-implemented controls. Specifically, regions 18 can have components added or removed while the network is in operation, without requiring network 14 to be shut down with the result that network 14 is scalable and network 14, regions 18 and region servers 24 remain operational while such component changes are being effected. Thus, for example, additional bridges 36 or different transducers 46 can be added to or removed from a region 18 as desired. Further, new services and/or capabilities can also be added to regions 18 and merely requires that appropriate servlets be registered in the regions 18. This also allows for physical components to be serviced without affecting network 14 or regions 18.

Services and capabilities can also be loaded over network 18. For example, when a region 18 is started up, the services, adapters, gateways and transducers can be loaded onto region 18 over the network from other regions 18 or from a data base maintained for that purpose on network 18. The components and services can also be loaded on demand from a specific region 18 or region server 24 within a region 18 when required. These services, etc. can be executed remotely for a region 18 or actually loaded into the region 18 and executed locally, as discussed below.

To implement this "hot-plugability", a layer of indirection is employed between components of region 18 and requests for services of these components. In a presently preferred embodiment of the invention, region manager 22 maintains a record, or availability list, indicating the available components within a region 18 and each request for services of a component is made by accessing this list to determine the available components. To add new components and/or services to a region 18, an appropriate addition is made to this availability list when the component/service is available. To remove a component for preventative maintenance, etc., the component is removed from the availability list and the component can be removed or taken off line when it has completed its present task. As will be apparent to those of skill in the art, the availability list described above is only one possible manner in which a determination of the components available within a region 18 and/or other regions 18 can be accomplished and the present invention is not limited to the use of such a list.

This also allows for hardware and/or license balancing to be performed. For example, a region 18 may include one or more text to speech transducers 46 which rely upon special purpose hardware or software which is capable of performing (or which is only licensed to perform) a fixed number of simultaneous transformations. In such a case, the service list can identify services/components which are to be employed before others and can also refer to components/service in other regions which can be accessed via communications backbone 28.

In the text to speech example, once the fixed number of simultaneous text to speech transformations is being performed, additional requests for text to speech transformations can be referred, via references in the service list, to another region 18 which has similar special purpose hardware, or which has additional licenses. In such a case, the service list can instead indicate an alternative transducer 46 which is less efficient than the licensed system, and which can be employed only once all of the special purpose hardware transducers 46 are occupied. In this manner, requests for text to speech are met and the license, if any, is not exceeded and/or utilization of hardware is improved. As will be apparent, if a transducer 46 is not fully occupied, region manager 22 can permit other regions 18 to employ the surplus capacity, by reporting available capacity to these other regions 18 via backbone 28, thus permitting efficient use of the hardware and/or licensed capacity of network 14.

In a similar fashion, the level of utilization of each region server 24 can be monitored by the region manager 22 and the service list can be appropriately updated by the region manager 22 to indicate that components at under utilized region servers 24 be employed before similar components at regions servers 24 with higher utilization levels.

Thus, efficient use can be made of existing network resources and resources can be added or removed, as desired. While it is presently preferred that region manager 22 maintain the service list for all components available in a region 18, it is also contemplated that in some circumstances service lists may be maintained at each region server 24 for some or all services provided therein. For example, it is contemplated that one or more region servers 24 maintain a list of transducers 46 available at the region server 24. It is also contemplated that, if a region server 24 does not find a required component available in its list, a request can be sent to other region servers 24, either directly or via region manager 22, via communications backbone 28 for access to the required component or a service list indicating services available at other regions 18 can be maintained in each region manager 22 and consulted, as needed, to determine where a service is available. Region manager 22 can then either have the service remotely executed by another region 18 or can download the service, via network 14, onto a region server 24 in region 18 for execution thereon.

Another advantage of network 14 is its ability to provide tunneling for IP addresses (or similar addressing schemes). Specifically, many network security models include the recognition of a user's IP address, as contained in the IP header on each IP packet, as part of the security model. A message received from an unrecognized IP address is generally refused by the network. While this model can provide reasonable results in many cases, it fails with mobile or nomadic users. For example, the IP packets sent by a salesman trying to access his employers' network from a remote location will have a different IP address, once the packet is routed, than they would when sent from the salesman's home location, and the messages will thus be refused by the employers' network. With a network in accordance with the present invention, such as network 14, IP packets are "tunneled" between the home region and the remote region. A packet sent from the remote region will be sent as an encapsulated packet to the home region, to preserve its IP address, and the home region will de-encapsulate the received packet and forward it to the desired service with the original IP header/address intact. Similarly, packets received at the home region from the service will be encapsulated and sent to the remote region where they will be de-encapsulated and transmitted to the user. This tunneling is performed transparently to the user whenever a user connects to a remote region and is presently believed to provide significant advantages for users of networks employing IP address-based security models.

While only specific combinations of the various features and components of the present invention have been discussed herein, it will be apparent to those of skill in the art that desired sub-sets of the disclosed features and components and/or alternative combinations of these features and components can be utilized, as desired.

The present invention provides a novel distributed network which allows users to access telecommunications and other services from any access point in the network. These services are provided transparently to the user. For example, the user need take no special steps to access an HTML document from a PCS telephone. These services are also provided transparently to the service provider, for example the author of the HTML document does not need to alter the document to allow the user to access it via a PCS telephone.

The network can be customized for each type of client using parameters known for that client as defined in a client registry and can be customized for each user's preferences, as defined in the user's profile. Communications through the network are independent of the transport protocol employed, as all protocol, data, API, etc. conversions are automatically performed by the network. Also, the network and its services are transparent as to where the user connects to the network.

We claim:

1. A distributed service network comprising a plurality of regions connected by a communications backbone, wherein:

each of said regions comprises a plurality of region servers and a region manager in communication with said region servers;

each of said region servers comprises a plurality of bridges, a plurality of adapters, and a transducer matrix in communication with said bridges and said adapters;

each bridge is arranged to establish a preliminary connection with a client;

said region manager is arranged to identify client characteristics associated with said preliminary connection and transfer said preliminary connection to an appropriate bridge based upon the identified client characteristics, whereby connection to said network is transparent as to where said client connects to said network;

each adapter is arranged to establish a connection with an external service and to determine a service type associated with said service;

each adapter is further arranged to receive data in a first transport protocol associated with said service type and convert said first transport protocol to a protocol understood by a selected one of said region servers; and said transducer matrix is arranged to convert between data formats associated with said client characteristics identified by said region manager and data formats associated with said service type determined by said adapter.

2. A distributed service network comprising a plurality of regions, wherein:

each region comprises a plurality of regions servers and a region manager;

each server comprises at least one bridge, at least one adapter, and a set of transducers in communication with said bridge and said adapter;

said bridge is arranged to establish a preliminary connection with a client;

said region manager is arranged to identify client characteristics associated with said preliminary connection and transfer said preliminary connection to an appropriate bridge based upon the identified client characteristics, whereby connection to said network is transparent as to where said client connects to said network;

said adapter is arranged to establish a connection with an external service and to determine a service type associated with said service; and said set of transducers is arranged to convert between data formats associated with said client characteristics identified by said region manager and data formats associated with said service type determined by said adapter.

3. A distributed service network as claimed in claim 2 wherein said adapter is arranged to receive data in a first transport protocol associated with said service type and convert said first transport protocol to a generic protocol understood by a region server.

4. A distributed service network as claimed in claim 2 wherein:
each of said servers comprises a plurality of adapters;
each of said adapters is arranged to receive data in a first transport protocol and transmit in a second transport protocol; and
each of said adapters is arranged to forward received data to another adapter for retransmission in another transport protocol.

5. A distributed service network as claimed in claim 2 wherein said region is arranged to:
verify the identity of said client;
convert said preliminary connection to a complete connection; and
service data access requests from said client upon conversion of said preliminary connection to said complete connection.

6. A distributed service network as claimed in claim 5 wherein said identity of said client is verified through input of a user ID and password.

7. A distributed service network as claimed in claim 5 wherein said identity of said client is verified by identifying information implicit to said client.

8. A distributed service network as claimed in claim 7 wherein said implicit information includes one of an IP address, a pager number, and a cellular equipment identification umber.

9. A distributed service network as claimed in claim 2 wherein said region manager is further arranged to transfer said preliminary connection to an alternative bridge as a function of said identified client characteristics.

10. A distributed service network as claimed in claim 9 wherein said alternative bridge is associated with a different region server than said bridge with which said preliminary connection is established.

11. A distributed service network as claimed in claim 2 wherein said region manager is further arranged to transfer said preliminary connection to a different region server within said region if said client characteristics associated with said preliminary connection change.

12. A distributed service network as claimed in claim 2 wherein said region is arranged to access a user profile associated with said client and wherein said user profile is stored in said network.

13. A distributed service network as claimed in claim 2 wherein said region is arranged to access a personal agent associated with said client.

14. A distributed service network as claimed in claim 13 wherein said personal agent is accessed from a database engine associated with said region manager.

15. A distributed service network as claimed in claim 13 wherein said personal agent maintains a user profile associated with said client.

16. A distributed service network as claimed in claim 15 wherein said user profile identifies at least one of services to which said client subscribes, user preferences for various client devices, and billing information associated with said client.

17. A distributed service network as claimed in claim 13 wherein said personal agent is arranged to provide access to services data for user access requests.

18. A distributed service network as claimed in claim 17 wherein said services data includes at least one of e-mail services, passwords, and user identifications.

19. A distributed service network as claimed in claim 2 wherein said region is arranged to:
identify a home region associated with said client; and
access a user profile associated with said client from said home region.

20. A distributed service network as claimed in claim 2 wherein said region is arranged to:
identify a home region associated with said client; and
replicate in said region a user profile associated with said client from said home region.

21. A distributed service network as claimed in claim 2 wherein said set of transducers is arranged in a transducer matrix and wherein a transducer matrix switch is operative to select at least one transducer in said transducer matrix for conversion between data formats associated with said client characteristics and data formats associated with said service type.

22. A distributed service network as claimed in claim 21 wherein said transducer matrix switch is arranged to select a single transducer for said conversion.

23. A distributed service network as claimed in claim 21 wherein said transducer matrix switch is arranged to select a chain of transducers for said conversion.

24. A distributed service network as claimed in claim 21 wherein said transducer matrix switch is arranged to select parallel transducers for said conversion.

25. A distributed service network as claimed in claim 21 wherein said region is arranged to select transducers from different servers for said conversion.

26. A distributed service network as claimed in claim 21 wherein said region is arranged to select transducers from different regions for said conversion.

27. A distributed service network as claimed in claim 21 wherein said selection of said transducers is determined by accessing an entry in a look-up table, and wherein a first input of said look-up table corresponds to a data format associated with said client characteristics and a second input of said look-up table corresponds to a data format associated with said service type.

28. A distributed service network as claimed in claim 27 wherein said region is arranged to update entries in said look-up table as new transducers are added.

29. A distributed service network as claimed in claim 2 wherein said adapter is arranged to perform encryption and decryption.

30. A distributed service network as claimed in claim 2 wherein said region manager maintains an availability list arranged to enable identification of under utilized components throughout said network.

* * * * *

UNITED STATES PATENT AND TRADEMARK OFFICE
CERTIFICATE OF CORRECTION

PATENT NO. : 6,351,771 B1
DATED : February 26, 2002
INVENTOR(S) : Craddock et al.

It is certified that error appears in the above-identified patent and that said Letters Patent is hereby corrected as shown below:

<u>Column 15,</u>
Line 28, reads as "umber" should read -- number --

Signed and Sealed this

Thirtieth Day of July, 2002

Attest:

Attesting Officer

JAMES E. ROGAN
*Director of the United States Patent and Trademark Office*